(12) United States Patent
Gerke

(10) Patent No.: US 7,152,730 B2
(45) Date of Patent: Dec. 26, 2006

(54) CONVEYOR WITH PROFILED CHEEKS

(75) Inventor: Klaus Gerke, Bassum (DE)

(73) Assignee: Kolbus GmbH & Co. KG, Rahden (DE)

( * ) Notice: Subject to any disclaimer, the term of this patent is extended or adjusted under 35 U.S.C. 154(b) by 163 days.

(21) Appl. No.: 10/963,201

(22) Filed: Oct. 11, 2004

(65) Prior Publication Data
US 2005/0081480 A1 Apr. 21, 2005

(30) Foreign Application Priority Data
Oct. 16, 2003 (DE) .............................. 103 48 091

(51) Int. Cl.
*B65G 21/08* (2006.01)
(52) U.S. Cl. .............................. 198/860.3; 198/860.1; 198/861.1
(58) Field of Classification Search ............. 198/860.1, 198/860.3, 860.5, 861.1, 735.1, 735.3
See application file for complete search history.

(56) References Cited

U.S. PATENT DOCUMENTS

| | | | | |
|---|---|---|---|---|
| 4,930,623 A | * | 6/1990 | Johnson et al. | 198/860.1 |
| 4,982,835 A | * | 1/1991 | Butler et al. | 198/860.3 |
| 5,082,108 A | * | 1/1992 | Douglas | 198/860.3 |
| 5,186,314 A | * | 2/1993 | Clopton | 198/860.2 |
| 5,562,202 A | * | 10/1996 | Newcomb et al. | 198/861.1 |

FOREIGN PATENT DOCUMENTS

| | | |
|---|---|---|
| DE | 69 02 232 | 8/1971 |
| DE | 26 09 930 C2 | 8/1985 |
| DE | 3537135 * | 4/1987 |
| DE | 36 23 202 C1 | 11/1987 |
| DE | 89 01 800.1 | 8/1990 |
| DE | 41 38 435 A1 | 5/1993 |
| DE | 43 35 134 C2 | 12/1996 |
| DE | 297 13 290 U1 | 11/1997 |
| DE | 197 33 381 A1 | 3/1998 |

* cited by examiner

*Primary Examiner*—James R. Bidwell
(74) *Attorney, Agent, or Firm*—Alix, Yale & Ristas, LLP

(57) ABSTRACT

The invention pertains to a conveyor with profiled cheeks consisting of at least one profiled member that is manufactured from light metal and contains longitudinal hollow spaces that are partly realized in the form of sliding block channels, and of a cover for closing a cable channel arranged in the cheek. The invention proposes that the profiled member has an L-shaped base cross section with an upper limb that points outward in the operative position, that a sheet metal member is mounted on the base part in order to form the lower limb of the C-shaped base cross section of the cheek, wherein the sheet metal member contains openings that are spaced apart from one another in the longitudinal direction, and that the cover is removably arranged on the two limbs. Cables and lines can lead into and out of the closed cable channel through the openings without having to produce openings on the profiled member or the cover by way of mechanical processing. A two-part cable channel is formed by the upper limb of the C-shaped sheet metal member used.

19 Claims, 2 Drawing Sheets

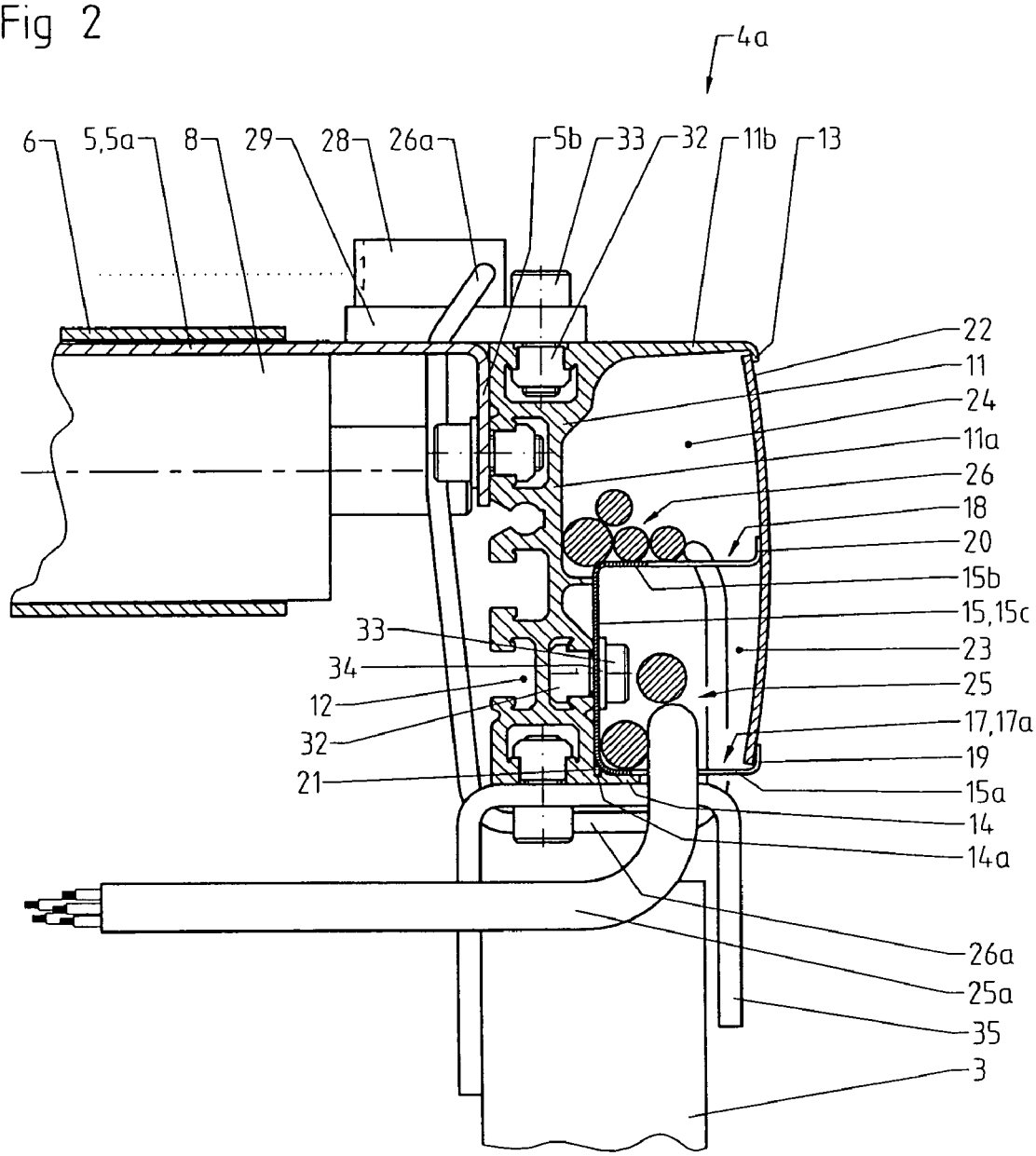

CONVEYOR WITH PROFILED CHEEKS

FIELD OF INVENTION

Figure 1:
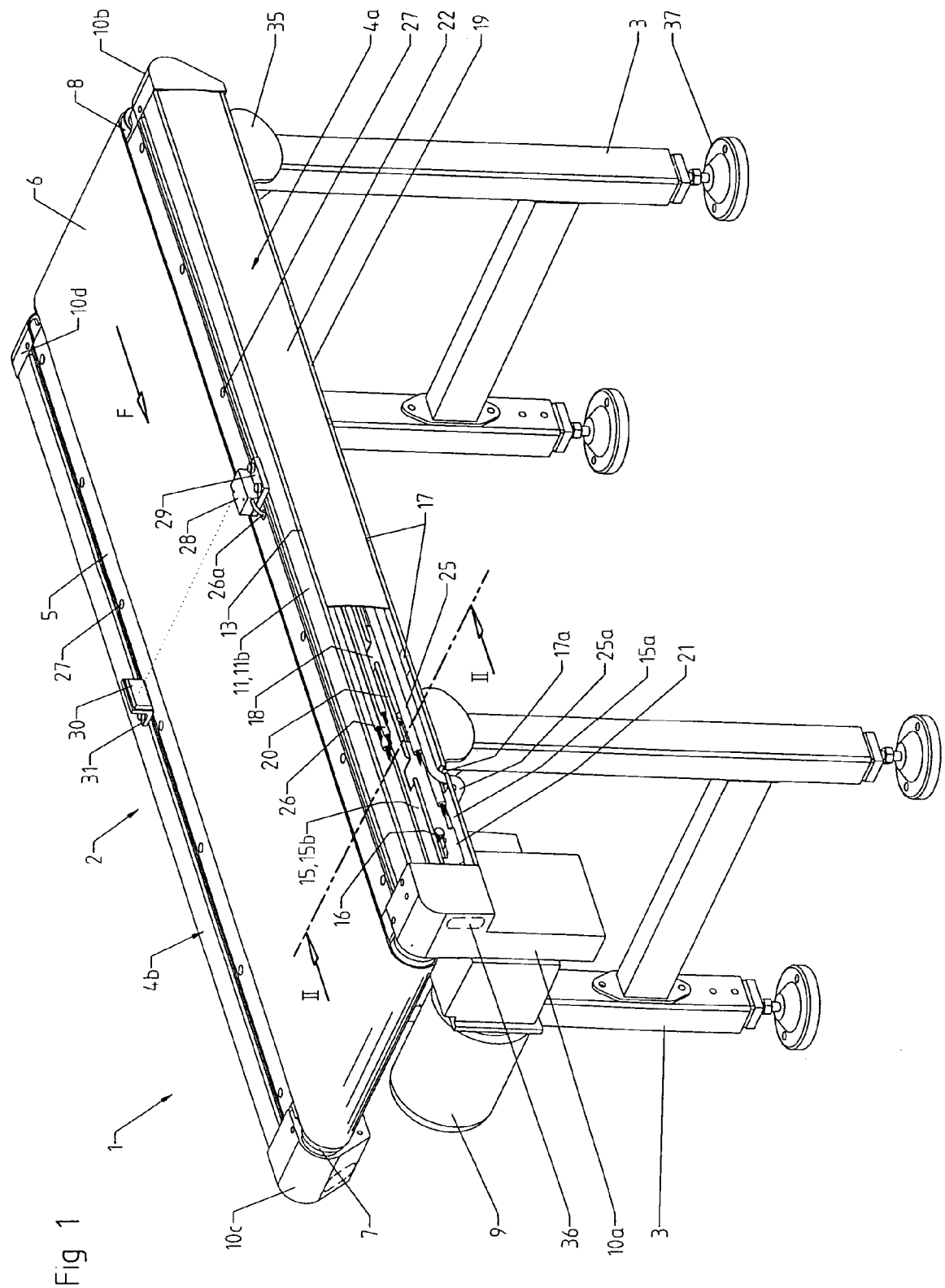

The present invention pertains to conveyor systems. In particular, the invention relates to conveyor systems having profiled cheeks and a cover for closing a cable channel arranged in the cheek.

BACKGROUND OF THE INVENTION

Conveyors are generally known and used in various industrial fields. For example, they are used in the subsequent processing of printed matter for conveying and distributing books and brochures, e.g., from one processing machine to another processing machine. Depending on the type of objects to be conveyed and the required movements, the conveyors are typically in the form of belt conveyors (conveyor belt, transport belt), band conveyors, chain conveyors, roller conveyors (gravity roller conveyors) or slat-band chain conveyors. Conveyors with profiled cheeks consisting of extruded light metal profiled members are broadly utilized. They comprise conventional mounting grooves that are realized in the form of T-grooves and serve for mounting the drive elements, the column systems, the lateral guides, the protective hoods or brackets for auxiliary devices such as separation locks, light barriers, etc. This makes it possible to inexpensively create individually adapted solutions with a modular system that is adapted to the profiled member used.

Such a profiled cheek is described, for example, in DE 36 23 202 C1. The profiled member used is a U-shaped or C-shaped members, respectively, wherein both limbs point away from the conveying section in the operative position. A closed cable channel for accommodating connecting cables, pneumatic lines, etc., is formed between the two limbs by attaching cover plates that longitudinally extend in the profiled member. The inlets and outlets for the cables and lines are present in the form of openings provided in the limbs of the profiled member.

DE 87 13 958 U1 discloses a cheek for conveyors that comprises a longitudinally extending cable channel with a U-shaped profile for accommodating electric cables, pipelines and the like. The limbs of this cable channel are provided with clips that engage into corresponding grooves on the inner sides of the upper and the lower limb of the C-shaped profiled member, wherein the lower groove is formed in such a way that the cable channel can be pivoted about the correspondingly designed lower clip until it reaches a limit stop in order to open the cable channel.

In order to produce the inlets and outlets for the cables and lines in conventional conveyors it is necessary to produce openings in the profiled members and/or the covers by means of mechanical processing, e.g., drilling. It is particularly disadvantageous that the required openings are not exactly defined until the conveyor reaches the installation site. This is associated with a significant installation expenditure and also complicates subsequently required installation procedures.

SUMMARY OF THE INVENTION

The present invention achieves the objective of a conveyor with a profiled cheek in which cables and lines can lead into and out of the closed cable channel without having to produce openings in the profiled member or the covers.

The invention in one form comprises separating the C-shaped base profile of the cheek into an extruded, essentially L-shaped profiled member and a sheet metal member that is produced by, for example, means of laser beam machining and is mounted on the profiled member. In the operative position, the sheet metal member acts as a lower limb and contains openings that are spaced apart from one another in the longitudinal direction and can be used as inlets and outlets for the cables and lines. The openings are preferably predefined in the form of a circular pattern of perforations and consequently remain closed until the perforations are punched out. Due to the close spacing of the openings, inlets and outlets for the cables and lines can be produced at nearly any location along the conveyor.

The sheet metal member has a C-shaped cross section and is mounted on an inner side of the profiled member at a web portion of the sheet metal member. The lower limb of the sheet metal member forms the aforementioned lower limb of the C-shaped base profile, wherein the lower limb extends transversely outwardly from the web. The sheet metal member upper limb divides the cable channel into two regions that are separated from one another. Consequently, it is possible to install, for example, power supply lines and control lines separately of one another. The upper limb of the sheet metal member is preferably provided with openings that are spaced apart from one another in the longitudinal direction such that the lines and cables can lead into and out of the upper cable channel through the lower cable channel.

The openings in the sheet metal member can extend as far as the outer edge of the limbs. This significantly simplifies the installation of the lines and cables. The limb(s) of the sheet metal member effectively represent the respective channel bottom that is laterally limited by the base part on one side and by the cover on the other side. When the cover is removed, bevels provided on the ends of the limbs form a lateral channel limitation, as well as contact surfaces for the cover.

An objective of the present invention is to provide a particularly simple and rigid attachment for the cover. The cover may be a simple sheet metal panel or a plastic plate. The lower edge region of the cover of which lies behind the bevel of the lower limb of the sheet metal member and the upper edge region of the which lies behind a lip arranged on the upper limb of the profiled member. The upper limb of the sheet metal member can cause the cover to assume an outwardly curved contour.

Another objective of the present invention is to provide a sheet metal member that connects the two cheeks to one another in order to form the belt member. It contains openings in the edge regions near the cheeks in order to lead through the connecting lines for auxiliary devices arranged on the upper side of the conveyor. This makes it possible to safely install the lines on the inner side of the cheeks. It should also be noted that the invention makes it possible to realize aesthetic conveyor designs because no visible lines and cables interfere with the appearance of the conveyor.

DETAILED DESCRIPTION OF THE DRAWINGS

Other objects and advantages of the invention will be evident to one of ordinary skill in the art from the following detailed description made with reference to the accompanying drawings in which:

FIG. 1 shows a perspective view of a conveyor belt consistent with the present invention, in which the cover of the cable channel is partially omitted; and FIG. 2 shows a section through the left cheek of the conveyor, consistent with the present invention, along the line II—II shown in FIG. 1.

DESCRIPTION OF THE PREFERRED EMBODIMENT

With reference to FIG. 1, the general design of a conveyor is identified as a whole by the reference number 1. The base of this conveyor belt is formed by a belt member 2 that includes the left and right cheeks 4a, 4b that are connected to one another by a U-shaped sheet metal member 5. The web 5a of this sheet metal member 5 forms a supporting surface for the upper section of a belt 6 that revolves in the conveying direction F. Columns 3 are connected to this belt member 2 by means of belt member brackets 35 and supported on the floor with the aid of articulated legs 37. A driving roller 7 and an idle roller 8 for the belt are supported on the end faces of the belt member 2 in installation parts that are not illustrated in detail. The driving roller 7 is driven by a geared motor 9 via conventional driving means. The respective bearing points and drives of the two rollers 7, 8 are covered with protective hoods 10a, 10d. The cheeks 4a, 4b of the conveyor belt 1 according to the invention include an extruded or drawn profiled member 11 of, for example, aluminum.

With reference to FIG. 2, in one embodiment of the invention the profiled member has a substantially L-shaped cross section which includes a base part 11a and a limb 11b arranged on an end of the base part 11a. The limb 11b extends transversely outwardly, relative to the conveying section, from the base part 11a. A sheet metal member 15 in the form of, for example, a sheet metal profile with a C-shaped base cross section is mounted on the inner side of the profiled member 11. The sheet metal member 15 has an upper limb 15b and a lower limb 15a both of which point away from the sheet metal conveyor member 5. The web 15c of this sheet metal member 15 is clamped in position on the above-mentioned inner side of the profiled member 11 by means of rhomboid sliding blocks 32 accommodated in a sliding block channel 12 of the profiled member 11, as well as hexagon socket screws 33 with assigned washers 34.

In one embodiment of the invention, the sheet metal member 15 is produced, for example, by means of laser beam machining and additional forming processes. For example, bending of a sheet metal panel. If so required, a quasi-endless sheet metal profile can be cut to the respectively required length. The sheet metal member is positioned on the profiled member 11 in such a way that the L-shaped cross section of the profiled member 11 and the lower limb 15a of the sheet metal member 15 form a C-shaped base profile of the cheeks 4a, 4b.

In order to mount the sheet metal member 15 in the exact position, the profiled member 11 may include a lip 14 on the lower end of the base part 11a, wherein the sheet metal member 15 lies on this lip with its lower limb 15a. In this case, several projections 21 may extend in the longitudinal direction of the sheet metal member 15 and are arranged in the region of the bending edge to engage into a longitudinal groove 14a arranged in the lip 14. The installation is additionally simplified by mounting bores in the sheet metal member 15 that include widened oblong holes 16 in order to insert the rhomboid sliding blocks 32 into the respective sliding block channel 12.

The cable channel that can be closed with a cover 22 is situated in the region between the limb 11b of the profiled member 11 and the lower limb 15a of the sheet metal member 15, wherein said cable channel is divided into an upper cable channel 24 and a lower cable channel 23 by the upper limb 15b of the sheet metal member 15. The two limbs 15a, 15b of the sheet metal member 15 create the respective channel bottom that is laterally limited by the base part 11a on one side and by the cover 22 on the other side. When the cover 22 is removed, bevels 19, 20 provided on the ends of the limbs 15a, 15b form a lateral channel limitation.

These bevels 19, 20 simultaneously serve as contact surfaces for the cover 22. The cover may be formed of, for example, a sheet metal panel or a plastic plate and may be arranged such that its lower and upper edge regions respectively lie behind the bevel 19 of the lower limb 15a and behind a lip 13 arranged on the limb 11b of the profiled member 11. The upper limb 15b of the sheet metal member 15 can cause the cover to assume an outwardly curved and thusly robust contour.

The inlets and outlets for the cables and lines accommodated in the cable channels 23, 24 are realized in the form of openings 17, 18 in both limbs 15a, 15b of the sheet metal member 15. The openings are spaced apart from one another in the longitudinal direction. For example, the openings may be uniformly spaced along the sheet metal member 15 over at least one half the longitudinal extent of the conveyor belt. In one embodiment of the invention, the openings 17 in the lower limb 15a are predefined in the form of perforations that are punched out in order to create an actual opening 17a. The openings 17a, 18 may extend as far as the outer edge of the limbs 15a, 15b and are thusly open toward the outer edge of the sheet metal limbs. This significantly simplifies the installation of the cables and lines because the lines do not have to pulled through the openings 17a, 18.

Due to the division into two cable channels 23 and 24, in one embodiment of the invention, it is possible to separately install supply lines 25 and control lines 26. The transitions of the cables and lines from for example, one conveyor to the next conveyor and to the preceding and the ensuing processing machines is achieved with passages 36 in the protective hoods 10a, 10b that are predefined in the form of perforations that can be punched out in order to open the passages 36. FIGS. 1 and 2 show a motor service cable 25a that leads out of the lower cable channel 23 and a light barrier service cable 26a that leads out of the upper cable channel 24. This creates a configuration where lines that interfere with the aesthetic appearance of the conveyor 1 are installed on its upper side and outer sides. For example, the light barrier service cable 26a initially leads into the lower cable channel 23 through an opening 18 in the upper limb 15b and then downward and out of the cheek 4a through an opening 17a that lies directly underneath the former opening. The line extends upward on the inner side of the left cheek 4a and leads to the upper side of the conveyor belt 1 through an opening 27 in the web 5a of the sheet metal member 5. The line is connected as directly as possible to a light barrier 28 on the upper side of the conveyor belt.

The light barrier 28 may be on a bracket 29 that is conventionally fixed on the profiled member 11 with sliding blocks. A reflector 30 mounted on the opposite side on the profiled member 11 of the right cheek 4b by means of a bracket 31 is assigned to the light barrier 28. The aforementioned opening 27 may be produced during the manufacture of the sheet metal member 5, wherein a row of spaced-apart openings 27 is respectively arranged in the sheet metal member 5 along both outer edges of the web 5a.

With regard to FIG. 2, different T-shaped sliding block channels 12 are arranged in the profiled member 11, wherein various auxiliary parts can be mounted on the cheeks 4a, 4b in said sliding block channels by means of conventional sliding blocks, e.g., the rhomboid sliding blocks 32. The belt member bracket 35 is mounted on the underside of the profiled member 11 with a sliding block channel, wherein brackets 29, 31 for auxiliary devices, e.g., the above-mentioned light barrier 28 with the reflector 30, can be mounted on the upper side with the corresponding sliding block channel. The two limbs 5b of the U-shaped sheet metal member 5 are respectively mounted on the outer side of the profiled member 11 of the left and right cheeks 4a and 4b that faces the conveying section, namely with an upper sliding block channel. Additional sliding block channels 12 on this outer side serve for mounting accessory parts for supporting the driving roller, the idle roller and, if applicable, the tensioning roller and for attaching the geared motor and other functional units. The sheet metal member 15 that forms both channel bottoms is mounted on the inner side of the profiled member 11 that points away from the conveying section with the sliding block channel 12.

While preferred embodiments of the invention have been set forth for the purpose of illustration, the foregoing description should not be deemed a limitation of the invention herein. Accordingly, various modifications, adaptations, and alternatives may occur to one of skill in the art without departing from the spirit and scope of the present invention.

The invention claimed is:

1. A conveyor with cheeks, said cheeks defined in part by a profiled member with longitudinal hollow spaces that are accessible from a lateral surface of the profiled member as a sliding block channel and a cover for closing a cable channel arranged in the cheek; wherein the improvement comprises that:
   said profiled member has a base part having a substantially horizontal upper limb that extends in an outward direction relative to the conveyor, and a substantially vertical portion that extends downward from the upper limb;
   a sheet metal member is mounted on the substantially vertical portion of the profiled member in order to form a lower limb, said sheet metal member including a plurality of longitudinally spaced openings; and
   said cover is removably arranged on the upper and the lower limbs.

2. The conveyor with profiled cheeks according to claim 1, wherein the plurality of longitudinally spaced openings are formed by punching out predefined perforated areas.

3. The conveyor with profiled cheeks according to claim 1, wherein the sheet metal member has an upper limb, and a web intermediate the upper and lower limbs, wherein the upper and lower limbs extend in a substantially same direction and wherein the web is mounted on an inner side of the vertical portion so as to define the cable channel into an upper region between the sheet metal upper limb and an inner surface of the base part horizontal upper limb.

4. The conveyor with profiled cheeks according to claim 3, wherein the upper limb of the sheet metal member is provided with openings that are spaced apart from one another in the longitudinal direction and arranged approximately above the openings in the sheet metal member lower limb.

5. The conveyor with profiled cheeks according to claim 1, wherein the plurality of longitudinally spaced openings extend as far as the outer edge of the sheet metal member limbs such that a line can be placed into the openings from outside while the cover is open without passing an end of the line through the opening.

6. The conveyor with profiled cheeks according to claim 1, wherein the sheet metal member is provided with bevels on the ends of the sheet metal member limbs, wherein said bevels serve for forming an effective channel limitation when the cover is removed and for providing contact surfaces for the cover.

7. The conveyor with profiled cheeks according to claim 6, wherein the cover lies behind the bevel of the lower limb of the sheet metal member with its lower edge region and behind a lip arranged on the base part horizontal upper limb in a groove arranged in the limb with its upper edge region.

8. The conveyor with profiled cheeks according to claim 6, wherein the cover lies behind the bevel of the lower limb of the sheet metal member with its lower edge region and a groove arranged in the limb with its upper edge region.

9. The conveyor with profiled cheeks according to claim 3, wherein the upper limb of the sheet metal member causes the cover to assume an outwardly curved contour.

10. The conveyor with profiled cheeks according to claim 1, wherein the sheet metal member is provided with oblong holes that are spaced apart from one another in the longitudinal direction in order to mount said sheet metal member on the profiled member, wherein these oblong holes are configured to allow sliding blocks to be inserted through them.

11. The conveyor with profiled cheeks according to claim 1, wherein the substantially vertical portion of the base part includes a lip and a longitudinal groove arranged in said lip configured to allow positioning of the sheet metal member.

12. The conveyor with profiled cheeks according to claims 1, wherein the cheeks are mounted on limbs of a U-shaped sheet metal member that forms a supporting surface for a belt, wherein said u-shaped sheet metal member contains openings that are arranged in a web of the u-shaped sheet metal member along the u-shaped sheet metal member limbs and serve for leading through lines.

13. The conveyor with profiled cheeks according to claim 1, wherein the conveyor is selected from a belt conveyor, a band conveyor, a chain conveyor, a roller conveyor, or a slat-band chain conveyor.

14. A conveyor system cheek assembly comprising:
   a profiled member having a base portion with a limb portion, said limb portion extending substantially perpendicular to the base portion, said profiled member having a plurality of sliding block channels;
   a sheet metal member having an upper extension and a lower extension connected together by a web portion, said upper and lower extensions laterally extending in a substantially uniform direction from the web portion to partially define a lower recess, and said web portion fixed to the base portion such that the upper extension and the limb portion partially define an upper recess;
   a plurality of removable portions formed in the upper and lower extensions of the sheet metal member such that when the removable portions are removed respective openings are defined in the sheet metal member; and
   a cover selectively fixed to the profiled member arm and the sheet metal lower extension.

15. The system of claim 14, wherein the openings are uniformly spaced along the sheet metal member over at least one half the longitudinal extent of the conveyor belt.

16. The system of claim 14, wherein
   the sheet metal member has an upper transverse extension and a lower transverse extension connected together by a vertical web portion fixed to the vertical portion of the base, said upper extension and upper arm of the base define opposite walls of an cable upper channel and said upper extension and lower extension defining opposite walls of a lower cable channel; and both said upper extension and said lower extension have said openings such that cables in the upper channel can pass through some of the openings into the lower channel and cables in the lower channel can pass out of the cheek assembly through the lower extension.

17. In a conveyor system having an endless moving belt supported between two longitudinally extending cheeks, at least one of which is a cheek assembly having a base member with a substantially C-shaped profile defining an inner lateral surface facing the belt and an outer lateral surface facing away from the belt, the outer lateral surface defining a longitudinal cable channel, and a cover for closing the cable channel, the improvement wherein:

said base member has a substantially vertical portion and an upper limb portion extending transversely outwardly from the vertical portion;

a longitudinally extending sheet metal member is fixed to the base member and forms a lower limb extending transversely outwardly from the vertical portion at a distance from the upper limb such that the base member and sheet metal member form said cable channel;

the sheet metal member has a multiplicity of longitudinally spaced apart cable accommodation openings for cables to pass out of the cheek assembly, said sheet metal member having an upper extension and a lower extension connected together by a web portion, said upper and lower extensions laterally extending in a substantially uniform direction from the web portion to partially define a lower recess, and wherein said web portion is fixed to the base such that the upper extension and the upper limb portion partially define an upper recess; and the cover is removably arranged on the upper and lower limbs.

18. The system of claim 17, wherein the openings are blocked with removable tabs that can be selectively removed to accommodate the penetration of a cable out of the cable channel.

19. The system of claim 17, wherein during operation of the conveyor, the number of blocked openings is at least equal to the number of openings that accommodate cables.

* * * * *